April 18, 1950 C. A. BRADY, JR., ET AL 2,504,386
REAR VIEW MIRROR HAVING TWO POSITION SETTING MEANS
Filed July 22, 1948 2 Sheets-Sheet 1
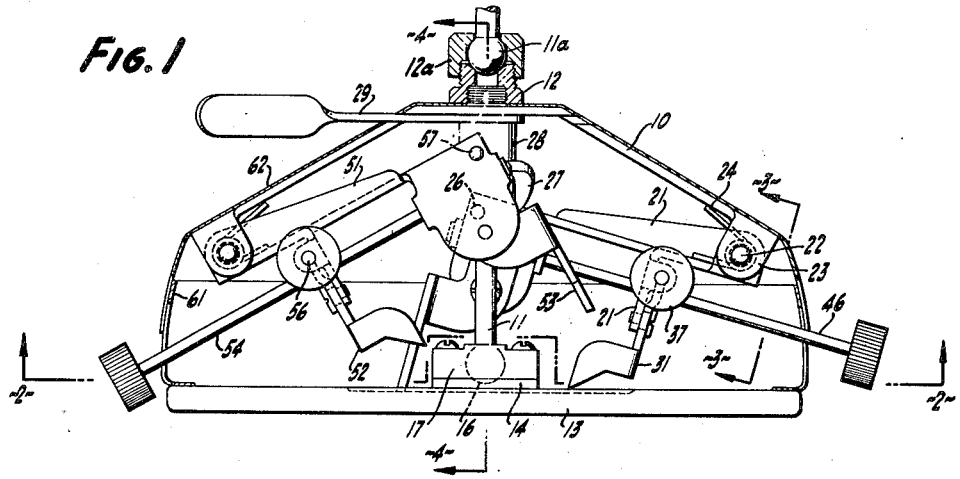
Fig. 1
Fig. 2
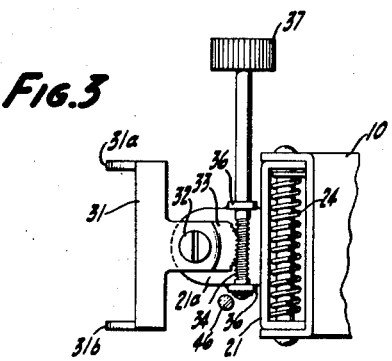
Fig. 3
INVENTOR.
CHARLES A. BRADY, JR.
JOHN J. BARICH, JR.
BY
Harper Allen
ATTORNEY April 18, 1950 C. A. BRADY, JR., ET AL 2,504,386
REAR VIEW MIRROR HAVING TWO POSITION SETTING MEANS
Filed July 22, 1948 2 Sheets-Sheet 2

INVENTOR.
CHARLES A. BRADY, JR.
JOHN J. BARICH, JR.
BY
ATTORNEY

Patented Apr. 18, 1950

2,504,386

UNITED STATES PATENT OFFICE 2,504,386

REARVIEW MIRROR HAVING TWO-POSITION SETTING MEANS

Charles A. Brady, Jr., San Francisco, and John J. Barich, Jr., San Mateo, Calif.

Application July 22, 1948, Serial No. 40,178

4 Claims. (Cl. 88—98)

The present invention relates to rear view mirrors, and is concerned more particularly with adjustable mirrors of this character which can be readily set to pre-adjusted positions.

It is a general object of the invention to provide an improved adjustable rear view mirror.

Another object of the invention is to provide a rear view mirror construction in which the mirror can be readily set to a pre-adjusted position.

Another object of the invention is to provide a rear view mirror construction in which the mirror can be placed selectively in any one of a plurality of pre-determined positions by a simple control.

Other objects and advantages of the invention will be apparent from the following description of a preferred embodiment thereof, as illustrated in the accompanying drawings, in which:

Figure 1 is a sectional plan view of the mirror embodying the invention.

Figure 2 is a vertical sectional view of the mirror construction taken as indicated by the line 2—2 in Figure 1.

Figure 3 is a fragmentary sectional view of a detail of construction as indicated by the line 3—3 in Figure 1.

Figure 4:
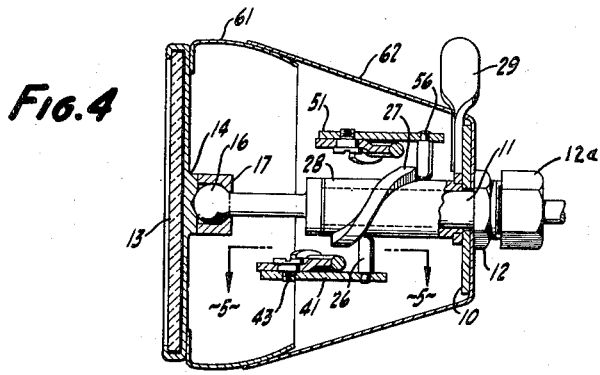
Figure 4 is a vertical sectional view of the mirror construction taken as indicated by the line 4—4 in Figure 1.

In the operation of automobiles by more than one driver, for example, a family car, where the husband and wife are of different heights, the conventional rear view mirror construction requires a readjustment of the mirror by each driver for effective use. In accordance with the instant invention, pre-set adjustments for the mirror are placed in the mirror construction so that the changing of the mirror from one setting for one driver to another setting for the other driver can be accomplished in a simple, fast operation.

Referring to Figures 1 and 2, the mirror construction includes a frame bracket 10 on which a central mounting stud 11 is secured by means of a nut 12. The nut 12 forms a socket with a second securing nut 12a to receive the ball end 11a of a mounting stud for securing the mirror construction at a desired location upon the automobile structure. A mirror element 13 is provided, including a suitable frame and mirror, and the frame is provided with a central boss 14 having a partial spherical depression to receive the ball end 16 of the stud 11 to which it is secured by means of a spherically recessed mounting block 17. Preferably, this ball and socket joint is placed as close to the plane of the mirror as practical construction will allow.

Associated with the universal mounting of the mirror element are respective sets of adjusting elements for determining respective planes of adjustment of the mirror for the different drivers of the automobile. These adjusting structures are identical in their construction and the one shown at the right-hand of Figures 1 and 2 will be described first. The adjusting structure includes an adjusting bracket 21 which is carried by a pivot pin 22 in opposite ears 23 formed at the adjacent end of the mounting bracket 10. A spring 24 coiled about the pin 22 urges the adjusting bracket 21 counterclockwise as viewed in Figure 1, and the limit of movement in this direction is determined by the engagement of a pin 26 (Figures 2 and 4) carried by the end of the bracket 21 with a helically shaped disk 27. The disk 27 is carried by a sleeve 28 journalled on the stud 11 and positioned between the bracket 10 and an annular flange of the stud. An adjusting handle 29 is carried by the sleeve 28 for adjustment of the sleeve in a manner later described.

Figures 5, 6:
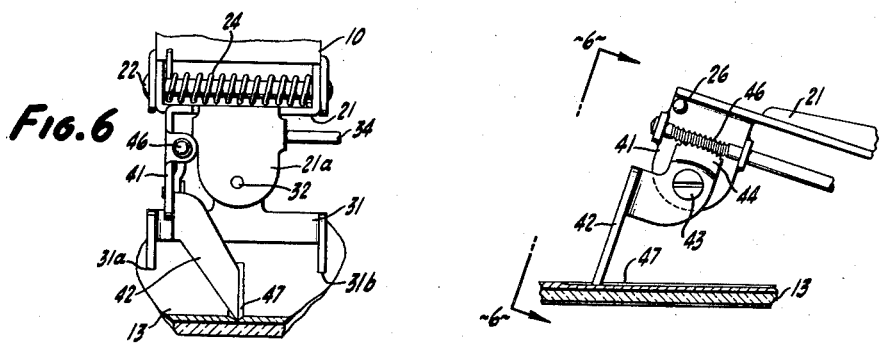
Figure 5 is a fragmentary sectional view taken as indicated by the line 5—5 in Figure 4.
Figure 6 is a sectional elevational view taken as indicated by the line 6—6 in Figure 5.

In order to establish or fix a plane of setting for the mirror element 13, the adjusting structure is provided with a two-pronged adjusting element which can be adjusted about one axis and a single-pronged adjusting element which is adjustable about an axis at right angles to the first axis, and these adjusting elements preferably engage the mirror at opposite sides of the ball and socket support therefor. As seen in Figures 1, 3 and 6, the bracket 21 is provided intermediate its ends with a bent portion 21a on which a two-pronged adjusting element 31 is pivoted at 32. The respective points 31a and 31b of the adjusting element 31 engage the mirror element at opposite sides of the universal point of support therefor. The upper end of the adjusting element 31 is provided with a worm segment 33 (Figure 3) which is engaged by a worm element 34 journalled in ears 36 of the bracket 21 and suitably held against endwise movement with respect thereto. The screw element 34 is provided with a knurled handle portion 37 at an accessible location for effecting pivoting adjustment of the element 31 about its axis 32 and consequently a relative tilting of its adjusting points 31a and 31b.

The other or single adjusting point of the adjusting bracket 21 is carried by a depending flange 41 (Figures 4, 5 and 6) at the end of the bracket 21 and comprises a single prong element 42 which is pivoted at 43 on the flange 41. The adjusting element 42 has a worm segment 44 engaged by an adjusting worm element 46. By turning the worm 46 the adjusting element 42 is rocked about its axis 43 to control the relative spacing of its point with respect to the mirror element. It will be noted that the prong of the element 42 is offset so that it is always in a line containing the longitudinal center line of the mirror and for purposes of insuring accurate engagement of this point with the mirror the mirror is provided with a longitudinal groove 47 at either side of its center for engagement by the respective single prong adjusting elements.

From the above description it is seen that the adjusting structure including the bracket 21 and the adjusting elements 42 and 31 provide for a three-point engagement of the adjusting elements with the mirror to determine its plane of positioning, and that the position of this plane is adjustable within the limits of adjustment provided by the worm wheel segments 33 and 44. Also, the point of the single prong element 42 engages the mirror element at the opposite side of its ball and socket mounting from the point 31a and 31b, so that the three points determining a plane of adjustment are spaced about the universal mounting of the mirror.

Similarly, the mechanism includes a second adjusting bracket 51 having a two-pronged adjusting element 52 mounted thereon in a manner previously described in connection with the element 31 and a single prong adjusting element 53 similar to the element 42. Also, respective adjusting worm elements 54 and 56 are provided.

As shown in Figures 1 and 4, one adjusting structure including the bracket 51 is withdrawn because its pin 57 is engaged with a high point of the helix 27, while the adjusting structure including the bracket 21 is in active position because its pin 26 is in engagement with the low point of the helix 27. Upon movement of the control handle or selector 29 clockwise from the position shown in Figure 2, the bracket 21 is withdrawn and the bracket 51 is concomitantly moved to active position under the influence of its spring so that the mirror will assume the adjusted position determined by the setting of the prongs of the adjusting elements 52 and 53 rather than the previously set position determined by the prongs of the adjusting elements 31 and 42.

During adjusting movement of the mirror, the housing portion 61, which is secured to the mirror element 13, is moved relative to the housing portion 62, which is supported on the bracket 10, and preferably the overlapping edges of these housing portions are made substantially spherical in shape about the center of relative movement, i. e., the axis of the ball portion 16 of the support stud 11, so that this relative adjustment can be effected without interference or binding.

Figure 7:
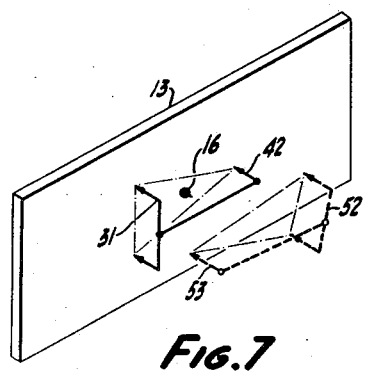
Figure 7 is a schematic perspective view illustrating the mirror adjusted to one of its pre-set positions.
Figure 8:
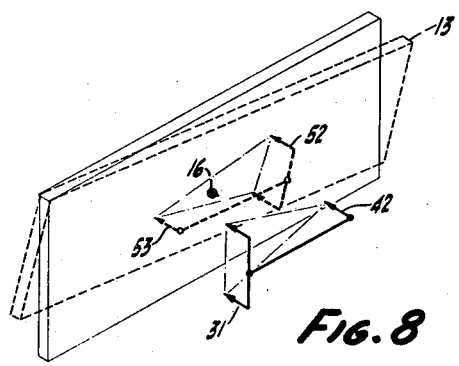
Figure 8 is a schematic perspective view illustrating the mirror adjusted to another of its pre-set positions.

Figures 7 and 8 illustrate schematically the relative position of the mirror element 13 and the triangularly arranged setting elements therefor, Figure 7 showing the position when the setting elements 42 and 31 are active, while Figure 8 shows the position when the setting elements 52 and 53 are active.

The copending application of Frank J. Pruellage, Serial No. 76,040, filed February 12, 1949, discloses an adjustable rear view mirror construction having some features in common with the construction disclosed and claimed in the present application.

While we have shown and described certain preferred embodiments of the invention, it will be apparent that the invention can be embodied in other forms and its scope therefore should be limited only by the scope of the claims appended hereto.

We claim:

1. A rear view mirror construction, comprising a frame, a mirror element having a universal mounting on the frame, a pair of adjusting brackets mounted respectively at opposite sides of said universal mounting and spring-urged towards said mirror element, each bracket extending past said mounting, a two-pronged adjusting element mounted on each bracket for tilting movement about an axis at one side of said mounting, a second element mounted on each bracket for adjusting movement about an axis substantially at right angles to said first axis and having a prong on the other side of said mounting, manually controllable means for effecting adjustment of each of said adjusting elements, whereby each of said adjusting structures can be pre-set to a selected plane of position for the mirror element, and a manually operable control member for bringing a selected one of said adjusting structures into operative relation with respect to the mirror element.

2. A rear view mirror construction, comprising a frame, a mirror element having a universal mounting on the frame, a pair of adjusting brackets mounted respectively at opposite sides of said universal mounting and spring-urged towards said mirror element, each bracket extending past said mounting, a two-pronged adjusting element mounted on each bracket for tilting movement about an axis at one side of said mounting, a second element mounted on each bracket for adjusting movement about an axis substantially at right angles to said first axis and having a prong on the other side of said mounting, a guide groove in said mirror element for said last-named prong, manually controllable means for effecting adjustment of each of said adjusting elements, whereby each of said adjusting structures can be pre-set to a selected plane of position for the mirror element, and a manually operable control member for bringing a selected one of said adjusting structures into operative relation with respect to the mirror element.

3. A rear view mirror construction comprising a frame, a mirror element mounted for universal movement on the frame and having a light reflecting surface, an adjusting structure for effecting positioning of said element and said surface therewith to any selected plane of positioning, said structure including settable means for fixing the selected plane of positioning with respect to said frame, a second adjusting structure for effecting positioning of said element and said surface therewith to any selected plane of positioning, said second structure also including settable means for fixing the selected plane of positioning with respect to said frame, and a control for bringing either of said adjusting structures into controlling relation with said element and said surface, whereby said element and said surface can be adjusted between the respective planes of position set into said respective adjusting structures.

4. In a rear view mirror construction, a support; a frame; means mounting said frame on said support for movement universally with respect to said support; a mirror; means mounting said mirror on said frame for adjustment to selected different positions with respect to said frame; a first positioning device adapted for being selectively operatively disassociated from said mirror or operatively associated therewith for determining the first of two alternative set positions of said mirror; a second positioning device including a position determining member mounted on said frame for adjustment relatively to said first position determining device and for movement from an ineffective position in which it is operatively disassociated from said mirror to an effective position in which it is in position determining association with said mirror for determining the second of said two alternative set positions of said mirror; and selector means operable firstly for moving said position determining member of said second position determining device from ineffective position to effective position and for concomitantly operatively disassociating said first position determining device from said mirror, and operable secondly for moving said position determining member of said second position determining device from effective position to ineffective position and for concomitantly operatively associating said first position determining member with said mirror.

CHARLES A. BRADY, Jr.
JOHN J. BARICH, Jr.

REFERENCES CITED

The following references are of record in the file of this patent:

UNITED STATES PATENTS

| Number | Name | Date |
|---|---|---|
| 54,118 | Crane et al. | Apr. 24, 1866 |
| 326,711 | Braune | Sept. 22, 1885 |
| 1,111,239 | Smelser | Sept. 22, 1914 |
| 1,628,218 | Beauchamp | May 10, 1927 |
| 2,052,770 | Hofer | Sept. 1, 1936 |
| 2,325,615 | La Hodny et al. | Aug. 3, 1943 |
| 2,356,432 | Roedding | Aug. 22, 1944 |